Oct. 29, 1929.   J. FRANK   1,733,871
EXTRICATING AND NONSKID DEVICE FOR VEHICLE WHEELS
Filed April 16, 1927   4 Sheets-Sheet 1

Jacob Frank
INVENTOR

BY *Victor J. Evans*
ATTORNEY

WITNESS:

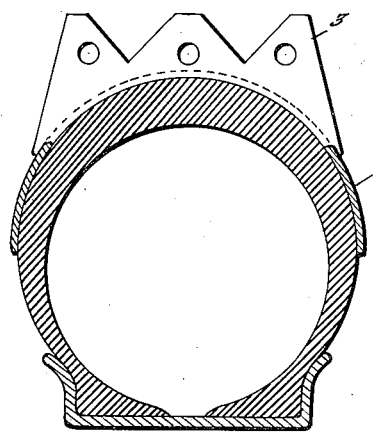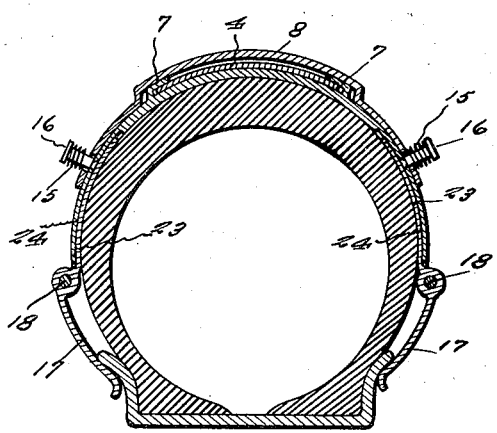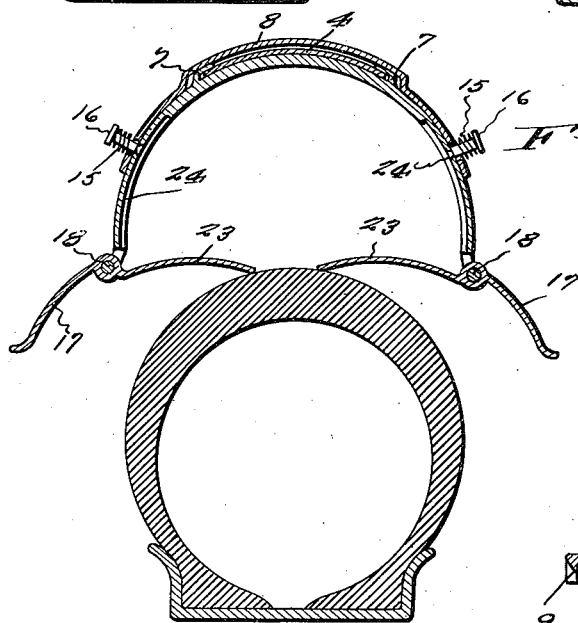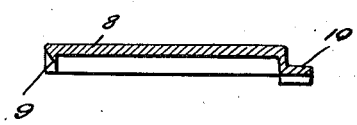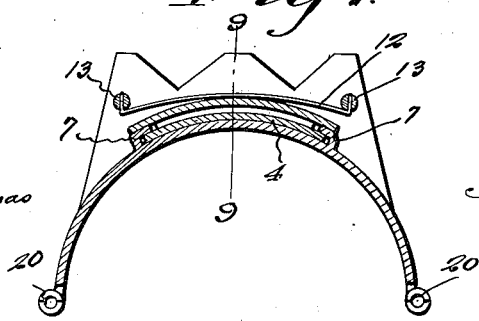

Oct. 29, 1929. J. FRANK 1,733,871
EXTRICATING AND NONSKID DEVICE FOR VEHICLE WHEELS
Filed April 16, 1927 4 Sheets-Sheet 3
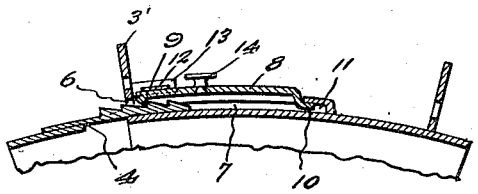
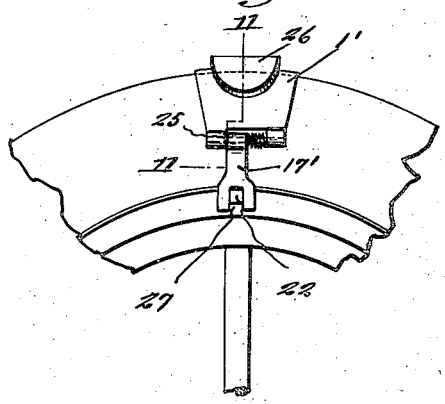
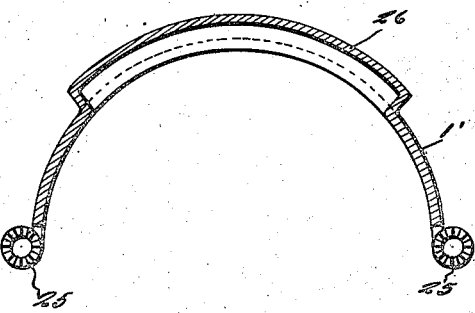
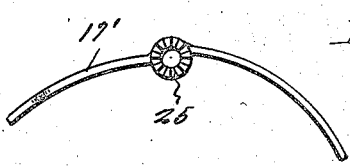
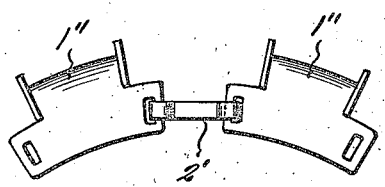
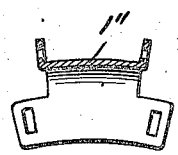
Jacob Frank INVENTOR
BY *Victor J. Evans*
ATTORNEY
WITNESS:

Oct. 29, 1929.   J. FRANK   1,733,871
EXTRICATING AND NONSKID DEVICE FOR VEHICLE WHEELS
Filed April 16, 1927   4 Sheets-Sheet 4
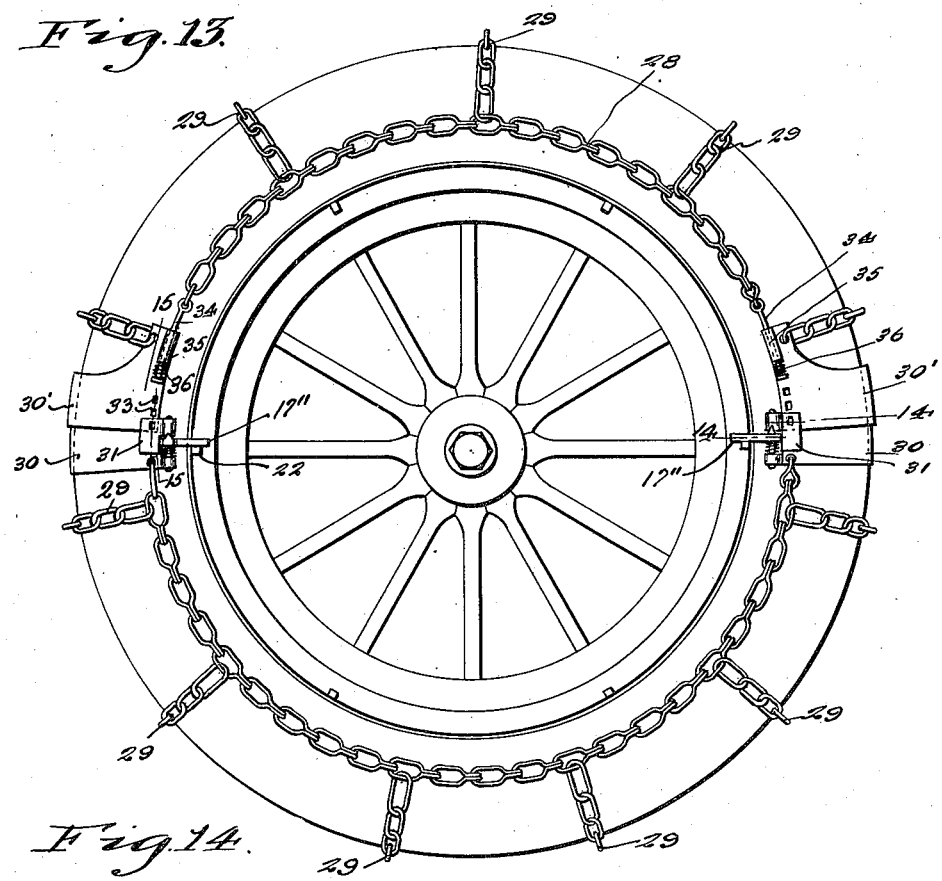
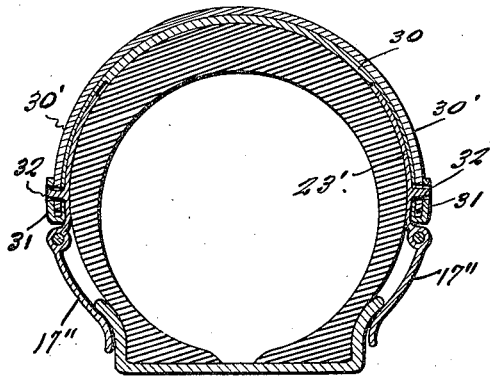
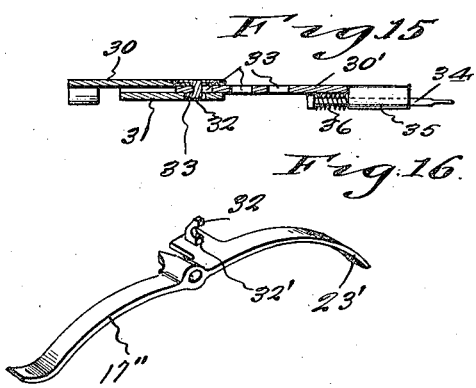
Jacob Frank INVENTOR Patented Oct. 29, 1929

1,733,871

UNITED STATES PATENT OFFICE

JACOB FRANK, OF CLEVELAND, OHIO

EXTRICATING AND NONSKID DEVICE FOR VEHICLE WHEELS

Application filed April 16, 1927. Serial No. 184,396.

This invention relates to a non-skid and extricating device for vehicle wheels, the general object of the invention being to provide means whereby the device can be easily and quickly placed on any part of a wheel without jacking up the wheel and while the wheel is partly embedded in a mud hole or other soft surface over which the vehicle is traveling.

Another object of the invention is to provide the device with arms which are adapted to embrace the side portions of a wheel rim to hold the device in place, with means for causing the arms to clamp the rim as the device is pressed upon the tread portion of the wheel, such means acting to cause the arms to more firmly grip the rim when the weight of the wheel and the weight of the vehicle comes upon the device.

A still further object of the invention is to make the device in sections, with means for holding each section on the wheel and with means for detachably fastening the ends of the sections together.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 4 is a section on line 4—4 of Figure 1.

Figure 5 is a section on line 5—5 of Figure 1.

Figure 6 is a view similar to Figure 5, but showing the device about to be placed on the tire.

Figure 7 is a section on line 7—7 of Figure 1.

Figure 8 is a sectional view of the latch plate used in locking the ends of the device together.

Figure 9 is a section on line 9—9 of Figure 7.

Figure 10 is a view showing a single element used on a wheel.

Figure 11 is a section on line 11—11 of Figure 10.

Figure 12 is a view of one of the arms and its extension, with the clutch part thereof made in the form of ratchet teeth.

Figure 13 is a view similar to Figure 1, but showing a modification.

Figure 14 is a section on line 14—14 of Figure 13.

Figure 15 is a section on line 15—15 of Figure 13.

Figure 16 is a view of one of the arms and its extension used with the device shown in Figure 13.

Figure 17 is a side view showing two elements of the device connected together by a link which is of slightly different form from the link shown in Figure 1, the elements also being of modified form.

Figure 18 is a sectional view of one of the elements shown in Figure 17.

Figure 19 is a view of the link shown in Figure 17.

Figure 1:
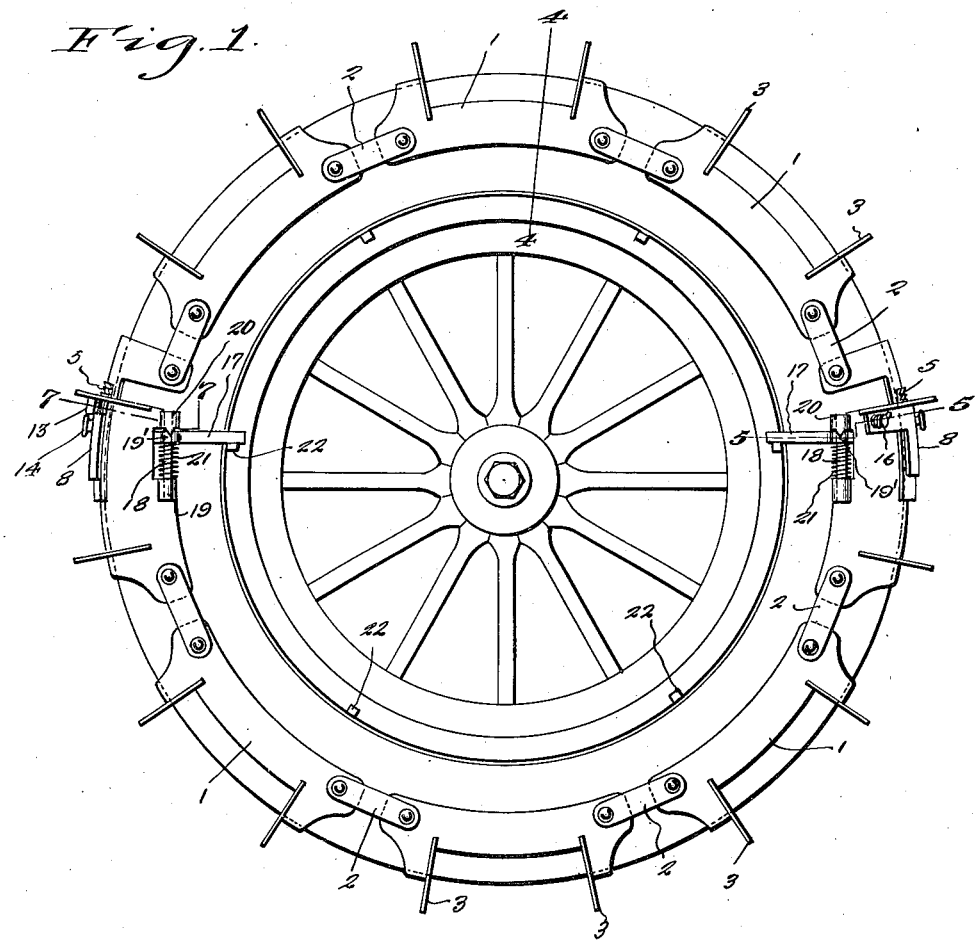
Figure 1 is a side view of a wheel, showing one form of my invention thereon.
Figure 2:
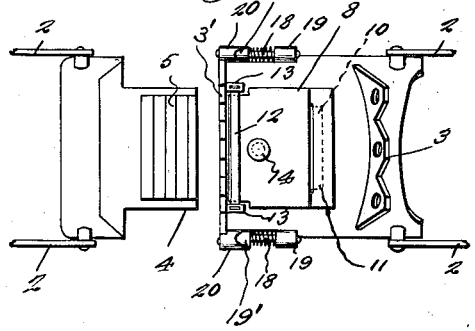
Figure 2 is a plan view, showing the locking means which are also shown at the right hand side of Figure 1.

In the form of the invention shown in Figure 1, the device is formed of two sections, each section being composed of a plurality of members 1 which are of trough shape in cross section and curved longitudinally to fit over the tread portion of the tire of a wheel, and the members are connected together by the links 2 which are pivotally connected with the members by rivets or the like, as shown. Each element carries one or more lugs 3 which are of toothed formation and are perforated, as shown in Figures 2 and 4.

Some of the end members of the sections are formed with tongues 4 which are provided with elongated laterally extending ratchet teeth 5 and each tongue is adapted to pass through a slot 6 formed in a lug 3' placed at the end of an end member of another section into guides 7 formed in said end member immediately in rear of the lug 3', where any one of the teeth 5 is engaged by a latch plate 8 which has its beak 9 beveled to engage the beveled end of the tongue so that the plate will be raised as the tongue is pushed through the slot 6 to permit the beak to pass over the teeth until the slack is taken out of the device and it fits snugly on the tire. Then the beak will engage a straight wall of one of the teeth and thus the device will be locked to the wheel.

The latch plate 8 is provided with a lip 10 at its rear which engages a pocket 11 formed in the member which carries the latch plate, so that the plate is hingedly arranged on the member. A leaf spring 12, having its ends fastened to the projections 13 on the lug 3', rests against the latch plate and normally holds it in locking position. The plate can be moved to unlocking position by the knob 14 fastened to its outer face.

Instead of using the leaf spring 12, shown at the right of Figure 1, I may use the coil springs 15 placed on the headed studs 16 carried by the member which supports the latch plate, these studs passing through holes formed in side extensions of the latch plate and the springs resting against these extensions and against the heads of the studs. This arrangement is shown on the right hand side of Figure 1 and also in Figures 5 and 6.

Some of the members of one section are provided with arms 17, one at each side of each member, and these arms are rotatably supported at the sides of the member through means of the shafts 18 which are supported by the bearings 19 formed at the sides of the member. Each arm is provided with a clutch part 19' for engaging a clutch part 20 on one of the bearings for holding the arm in adjusted position, a spring 21 being placed on the shaft and holding the clutch parts in frictional engagement. Each arm is of curved shape so that it will engage parts of the wheel or its rim and projections 22 are formed on the rim which are adapted to be engaged by the ends of the arms to prevent the device from slipping around on the tire. Each arm is formed with an extension 23 which is adapted to fit in an internal recess 24 formed in the member which carries the arm, when the arm is in gripping position, and these parts are so formed that when the arms are moved to their outer position to permit the member to be placed on the wheel, the free ends of the extensions 23 will extend well into the space formed by the member, as shown in Figure 7. Then when the member is pressed upon the tire, the extensions 23 will be forced into the member and into the recesses 24 and thus the extensions will cause the arms 17 to be moved into gripping relation with the wheel rim, as shown in Figure 5, so that the arms will be automatically operated by the placing of the member on the wheel to hold said member on the wheel or on the tire thereof. As will be seen, the greater the pressure with which the member is forced against the tire, the greater will be the gripping action of the arms on the rim so that there is no danger of the member being pulled from the wheel when the device is being used. Of course, the clutch means also act to hold the arms in operative position.

Figure 3:
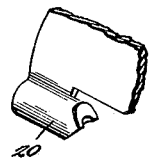
Figure 3 is a fragmentary view showing one of the clutch parts of a bearing on one of the members of the device.

Instead of using the clutch means for the arms shown in Figures 1, 2 and 3, I may make such means in the form of ratchet teeth, as shown at 25 in Figures 10, 11 and 12, and these figures show a single element 1' used on a tire, this element being formed with a projecting portion 26 which takes the place of the lug 3 shown in Figure 1. The arms 17' in this form of the invention are each provided with a notch 27 for engaging a projection 22 on the wheel rim so that the element will be held on the tire by the arms when the wheel is moving in either direction.

This form of the invention is useful for enabling a vehicle to extricate itself from a mud hole and where it is not necessary to place an encircling device on a wheel. Of course, this form of clutch means for the arms could be used in place of the clutch means shown in Figure 1.

Figures 13, 14, 15 and 16 show another form of the invention in which the ordinary side chains 28 and the cross chains 29 are used. This device is also formed of two sections and the ends of the sections are connected together by the means now to be described. A substantially U-shaped member 30 is connected to the end of each section and one of these members is formed with the guides 31 to receive the edges of the member 30' when the member 30' is moved over the member 30. The extensions 23' of the arms 17" which are carried by the member 30 are formed with the latch parts 32 which are adapted to pass through holes formed in the member 30 and in the guides 31 and also to pass through keeper holes 33 formed in the member 30' to lock said member 30' to the member 30. A plurality of these keeper holes 33 is formed in each side of member 30' so that the latch part 32 can engage the proper hole to take up slack in the device. As shown in Figure 16, each latch part 32 is formed with a beveled front end so that the member 30' will depress the same when said member is placed in the guides 31 and said latch part 32 is provided with a notch 32' in its rear face to receive a part of the wall of the keeper hole 33 to prevent accidental unlocking of the locking means after they have been moved into locking position. Thus in this form of the invention, the arms not only act to hold the device on the wheel by embracing portions of the wheel and projections on the wheel, as before described, but they also carry the latching means for locking the two end members of the sections of the device together.

In this form of the invention, I connect the chains of one section to its end members through means of the rods 34 carried by the ends of the side chains and engaging eye parts 35 formed in the members 30′, with springs 36 on the rods and arranged between the heads on the free ends of the rods and the eye parts of the members 30′.

This device must so fit the wheel or its tire that when in place, the springs 36 are under tension and thus they will keep the device taut on the wheel. In placing the device on an unworn tire, the latch means 32 would engage the first keeper holes 33 and the device should then so fit the tire that the springs 36 would be under tension. As the tire wears, the springs 36 will take up the slack in the chains and still hold the device tight on the tire until the tire wears sufficiently to place the latch means 32 in the second set of keeper holes. Thus with this arrangement, the device can be used on a tire from the time it is first in use until it has become so badly worn that it will have to be discarded, and it will be understood that this spring arrangement can be used on all the other forms of the invention.

Figures 17, 18 and 19 show a slightly different form of the invention in which the members 1″ are of slightly different shape from the members shown in Figure 1, and in which the links 2′ are formed with eyes at their ends for engaging slots in the members 1″.

From the foregoing it will be seen that I have provided a traction device which can be easily and quickly placed on any exposed part of a tire or tread part of a wheel without jacking up the wheel and while the same is mired in a mud hole or is partly embedded in snow, sand or the like and after the device is put in place, it will enable the vehicle to extricate itself from the mud hole and travel over soft surfaces where it will be impossible or difficult to pass without the device. The arms, as before stated, are automatically placed in gripping position on the wheel as the device is put in place, and the greater the pressure with which the device is forced against the wheel or tire, the greater will be the gripping action of the arms so that there is no danger of the device being pulled from the wheel when in use. The members, with their projecting lugs, will prevent the wheel from spinning or skidding in mud holes or on soft surfaces and the locking means will enable the ends of the device or the ends of the sections thereof to be easily and quickly fastened together or unfastened, and when fastened there is no danger of the parts becoming detached, for when the locking plate comes in contact with the ground, the pressure will tend to force the plate more firmly into locking engagement with the teeth of the tongue.

While the drawings do not show the arms on some of the sections, it will, of course, be understood that these arms can be used on all the sections, if desired.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A traction device for a vehicle wheel formed in sections, each section consisting of flexible means and lock carrying members at the ends of the flexible means, means for yieldingly connecting some of the lock carrying means to the flexible means and locking means on the lock carrying means for locking the ends of the sections together.

2. A traction device for a vehicle wheel formed in sections, each section comprising side and cross chains, U-shaped members connected with the ends of the side chains, one member of each pair of U-shaped members having keeper openings therein, guiding means on the other U-shaped members and locking means carried by the last mentioned U-shaped members for engaging the keeper openings in the other U-shaped member.

3. In combination with a wheel including a rim and a tire on the rim, projections on the sides of the rim, a member of substantially U shape to engage the tread part of the tire, bearing parts formed on the edges of the member, a pair of shafts carried by said bearing parts, an arm carried by each shaft and adapted to engage a projection when the member is placed on the tire, each arm having an extension extending into the member and acting to swing the arms into engagement with the wheel when the member is pressed upon the tire and clutch means for frictionally holding the arms and their extensions in adjusted position.

In testimony whereof I affix my signature.
JACOB FRANK.